(12) United States Patent
Blackwood et al.

(10) Patent No.: US 9,418,808 B2
(45) Date of Patent: Aug. 16, 2016

(54) RFID TAG BASED STATE MONITORING OF CONTACTORS

(71) Applicant: Eaton Corporation, Cleveland, OH (US)

(72) Inventors: Andrew James Blackwood, Waukesha, WI (US); John F. Pflieger, Menomonee Falls, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/722,937

(22) Filed: May 27, 2015

(65) Prior Publication Data

US 2016/0189898 A1 Jun. 30, 2016

Related U.S. Application Data

(63) Continuation-in-part of application No. 14/584,118, filed on Dec. 29, 2014.

(51) Int. Cl.
| | |
|---|---|
| *G06F 17/00* | (2006.01) |
| *H01H 47/00* | (2006.01) |
| *H01H 50/54* | (2006.01) |
| *H01H 50/08* | (2006.01) |
| *G06K 19/077* | (2006.01) |

(52) U.S. Cl.
CPC ....... *H01H 47/002* (2013.01); *G06K 19/07758* (2013.01); *G06K 19/07773* (2013.01); *H01H 50/08* (2013.01); *H01H 50/54* (2013.01); *H01H 2201/00* (2013.01)

(58) Field of Classification Search
CPC ............ G06F 17/00; G06K 7/04; G06K 7/00; G06K 19/00; G06K 21/06
USPC .................. 235/375, 487, 492, 439, 444, 446
See application file for complete search history.

(56) References Cited

U.S. PATENT DOCUMENTS

| | | | |
|---|---|---|---|
| 5,754,387 A | 5/1998 | Tennies et al. | |
| 5,774,323 A | 6/1998 | Innes et al. | |
| 7,705,601 B2 * | 4/2010 | Zhou | H01H 1/0015 324/415 |
| 7,994,924 B2 * | 8/2011 | Brandt | H01H 9/168 340/572.1 |
| 2003/0016136 A1 | 1/2003 | Harvey | |
| 2003/0116634 A1 | 6/2003 | Tanaka | |
| 2014/0170971 A1 | 6/2014 | Walsh et al. | |

FOREIGN PATENT DOCUMENTS

| | | |
|---|---|---|
| DE | 102013211015 A1 | 12/2014 |
| EP | 0879472 A1 | 11/1998 |

OTHER PUBLICATIONS

European Search Report from corresponding Application No. 15202988.0, May 20, 2016.

\* cited by examiner

*Primary Examiner* — Edwyn Labaze
(74) *Attorney, Agent, or Firm* — Ziolkowski Patent Solutions Group, SC

(57) ABSTRACT

A motor starter or contactor having a radio frequency identification (RFID) tag incorporated therein for accurate determination of the position of contacts in the motor starter/contactor is disclosed. The motor starter/contactor includes separable contacts comprising a fixed contact structure and a movable contact structure having a closed position and an open position. An electromagnet is also included in the motor starter/contactor that is arranged to translate the movable contact structure between the closed position and the open position. An RFID tag is positioned on or adjacent the separable contacts to indicate the position of the movable contact structure in the motor starter/contactor.

18 Claims, 7 Drawing Sheets

RFID TAG BASED STATE MONITORING OF CONTACTORS

CROSS-REFERENCE TO RELATED APPLICATION

The present invention is a continuation-in-part of and claims priority to U.S. Ser. No. 14/584,118, filed Dec. 29, 2014, the disclosure of which is incorporated herein by reference in its entirety.

BACKGROUND OF THE INVENTION

Embodiments of the present invention relates generally to switches for use in motor vehicles and, more particularly, to vehicle switches having a self-identifying switch function. The self-identifying feature of the switches enables the placement of switches in any of a number of locations consistent with a customer's desired switch customization requirement, while providing for the identification of a switch regardless of its location, such that switches can be placed in any position within a defined network on the vehicle without changing the switch's functionality or the system wiring.

Additional embodiments of the present invention relate generally to electrical control switches and, more particularly, to control switches in contactors and motor starters having a radio frequency identification (RFID) tag incorporated therein. The incorporation of an RFID tag into a motor starter/contactor switch provides for an accurate determination of the position of contacts in the motor starter/contactor.

Electrical switches are used in motor vehicles as control switches for switching the motor vehicle lighting, the windshield wipers, the rear windshield heating, the cruise control functions, the internal central locking and other functions on and off. A number of such switches can be combined as control panels in the dashboard, in the center console or the like. In specialty vehicle markets—such as heavy trucks, agricultural equipment, and construction equipment, for example—many original equipment manufacturers (OEMs) produce custom dashboards for their customers. In doing so, the OEMs allow the customers to pick options as well as their associated switch locations. While such customization is desirable from the standpoint of the customer, such customization leads to significant overhead expenses for the OEMs with respect to managing customer options for the dashboards. That is, present methods of managing production for customer dashboards having customized options and associated switch locations requires separate drawings and wire harnesses for every vehicle manufactured. Furthermore, some OEMs may even install the wires for every option sold, but only connect the wires used with the individual customer dashboard order.

In the mix of switch functions, some switches provide input signals to a vehicle's microprocessor-based controller, often referred to as a body controller, or electronic controller unit (ECU), which receives the signal and makes logic decisions regarding how that function is to be performed or activated. Other switches are wired directly to their intended loads. Those switches providing an ECU input typically operate at very low current, typically in the range of 5 to 20 milliAmperes (mA), whereas direct-wired switches may handle loads up to 20 Amperes or more. Different contact materials are needed to accommodate these varying load ranges, as well as different sized wires and connectors. The arrangement or rearrangement of switches within the dashboard array is often limited in practice by the ability of the OEM to provide appropriate high current and low current wiring to support the desired functions. It is also common for OEMs to provide the same type of electrical connector and wires for all switch positions for economy and standardization, though the practice can result in a higher percentage of wiring errors at the time the vehicle is being assembled.

It is recognized that electrical control switches may be utilized in other environments beyond that of vehicle controls. One such alternative environment in which electrical control switches are utilized is in electromagnetic contactors and motor starters. Contactors are generally used in motor starter applications to switch on/off a load as well as to protect a load, such as a motor, or other electrical devices from current overloading. As such, a typical contactor has three contact assemblies—a contact assembly for each phase or pole of a three-phase electrical device. Each contact assembly, in turn, includes a pair of stationary contacts and a pair of moveable contacts. One stationary contact will be a line side contact and the other stationary contact will be a load side contact. The moveable contacts are controlled by an actuating assembly comprising a contact carrier and an armature magnet assembly which is energized by a coil to move the moveable contacts to form a bridge between the stationary contacts. When the moveable contacts are engaged with both stationary contacts, current is allowed to travel from the power source or line to the load or electrical device. When the moveable contact is separated from the stationary contacts, an open circuit is created and the line and load are electrically isolated from one another.

In operation of a motor starter/contactor, it is recognized the state of the contactor (opened or closed) is often needed but does not always correlate to the actuating coil being energized. The contactor can remain opened even though energy is applied to the coil due to failure of the coil itself or the movable contact assembly becoming jammed due to debris or other mechanical interference. Likewise, the contactor can remain closed even though energy has been removed from the coil due to contact welding or mechanical jamming of the movable contact assembly. The standard industry practice to definitively know the state of the contactor is to use an auxiliary contactor which is mechanically linked to the moving contactor assembly of the primary contactor. As the primary contactor moves as it opens and closes, the auxiliary contactor will likewise open and close.

While auxiliary contactors provide an effective means for determining the state of the contactor, it is recognized that the use of such auxiliary contactors are not without drawbacks. First, the auxiliary contactors are an accessory in most motor starters/contactors on the market due to the added cost of additional contactors. Second, the use of auxiliary contactors requires more wiring and additional control inputs, which also increases cost. This burden is compounded in the case of reversers where separate starters are required for energizing a motor to run in each of two directions, and in two-speed motors where separate starters are required for energizing the low speed coil and the high speed coil of the motor.

It would therefore be desirable to design a system that enables OEMs to reduce the cost of managing a custom dashboard. In doing so, the system and method would allow for dashboard customization without requiring the OEM to rewire/relocate the wire harnesses to accommodate the customization—thereby enabling vehicle OEMs to significantly reduce the engineering overhead and the wire count associated with a custom dashboard.

It would also therefore be desirable to provide a means for determining the state of a contactor that can be performed despite failure of the actuating coil, contact welding of the contacts, or the movable contact assembly becoming jammed due to debris or other mechanical interference, and without the need for any auxiliary contactor mechanically linked to the moving contactor assembly of the primary contactor and any associated wiring and equipment to determine the electrical state of the auxiliary contactor, therefore reducing the cost and complexity of the contactor.

BRIEF DESCRIPTION OF THE INVENTION

Embodiments of the present invention provide a vehicle control switches that provides a self-identifying switch function. The switches may be placed in any of a number of locations consistent with a customer's desired switch customization requirement, while providing for the identification of a switch regardless of its location, such that switches can be placed in any position within a defined network on the vehicle without changing the switch's functionality or the system wiring.

Embodiments of the present invention also provide a contactor that includes a switch having an radio frequency identification (RFID) tag associated therewith that provides for state monitoring of the contactor.

In accordance with one aspect of the invention, a contactor includes separable contacts comprising a fixed contact structure and a movable contact structure having a closed position and an open position, an electromagnet arranged to translate the movable contact structure between the closed position and the open position, and an RFID tag positioned on or adjacent the separable contacts to indicate the position of the movable contact structure.

In accordance with another aspect of the invention, a method of determining a state of a contactor that includes providing an RFID tag on a fixed contact structure of the contactor, providing an antenna on a movable contact structure of the contactor, and determining a position of the movable contact structure in one on a contacts open position and a contacts closed position, wherein determining the position of the movable contact structure further includes forming a communications path between the RFID tag and the antenna when the movable contact structure is in the contacts closed position and transmitting a switch signal from the antenna to an RFID reader remote from the contactor, the switch signal indicating that the movable contact structure is in the contacts closed position.

In accordance with yet another aspect of the invention, a contactor includes at least one pair of moveable contacts, at least one pair of stationary contacts, an electromagnet arranged to cause the at least one pair of moveable contacts to travel to a contacts open position and a contacts closed position with respect to the at least one pair of stationary contacts, an RFID tag located on the at least one pair of stationary contacts, and an antenna located on the at least one pair of moveable contacts, wherein a communications path between the RFID tag and the antenna is formed by the at least one pair of moveable contacts when the at least one pair of moveable contacts is in the contacts closed position.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to vehicle control switches having a self-identifying switch function, and a vehicle communications system for detecting the switches. The self-identification feature of the switches enables the placement of switches in any of a number of locations within a defined vehicle network consistent with a customer's desired switch customization requirement, while providing for the identification of a switch regardless of its location, such that switches can be placed in any position on the vehicle within that network without changing the switch's functionality or the system wiring.

Figure 1:
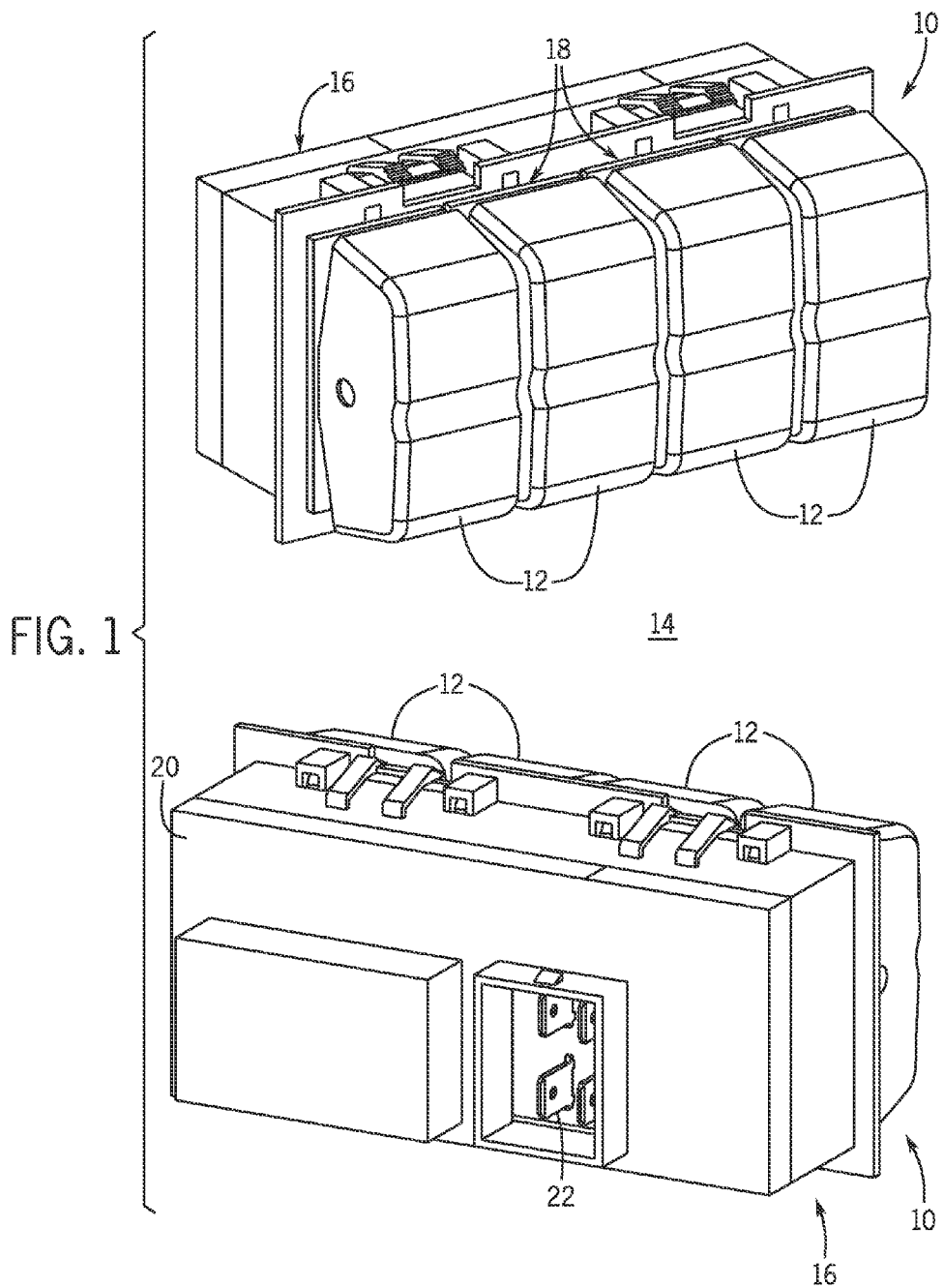
FIG. 1 shows front and rear views of a self-identifying vehicle switch module, according to an embodiment of the invention.

Referring to FIG. 1, the general structure of a switch module 10 having a plurality of switches 12 is shown according to an embodiment of the invention. The switch module 10 is incorporated as part of a dashboard 14 in a motor vehicle, for example in a commercial vehicle, such as a goods vehicle. An operator of the vehicle uses the switches 12 to operate various functions in the vehicle, such as for switching the motor vehicle lighting, the windshield wipers, the diesel fuel heating, or other specialized equipment on the vehicle. In the embodiment illustrated in FIG. 1, the switch module 10 comprises four switches 12; however, it is recognized that a greater or smaller number of switches 12 could be included in the module. For example, a switch module 10 could be provided having eight switches 12—arranged in a single row or in two rows of four, for example. While there is no limit on the number of switches 12 that can be included in switch module 10, it is recognized that for practical purposes—such as responsiveness and speed of switch functioning—the number of switches 12 in an individual module 10 will be limited to a reasonable number so as to maintain a minimum level of vehicle performance.

As further shown in FIG. 1, the switches 12 of switch module 10 are received within a module housing 16 that is fitted in the dashboard 14 of the motor vehicle. The housing 16 is formed as a generally hollow member configured to receive the individual switches 12 therein and includes mating features formed thereon, such as alignment tabs or slots 18, which enable mating of the switches 12 within the housing 16 in the correct orientation. A back surface 20 of the switch module 10 includes a power receptacle 22 formed thereon for enabling powering of the module.

According to embodiments of the invention, the switches 12 included in switch module 10 are configured as self-identifying switches. That is, each of the switches 12 includes data stored thereon regarding a unique address or identifier tying to the icon/function of the switch. Accordingly, the switches 12 may be placed in any of a number of locations in a module 10 and/or on the dashboard 14 consistent with a customer's desired switch customization requirement, while providing for the identification of a switch 12 regardless of its location, such that switches can be placed in any position within a defined network on the vehicle without changing the switch's functionality or the system wiring.

Figure 2:
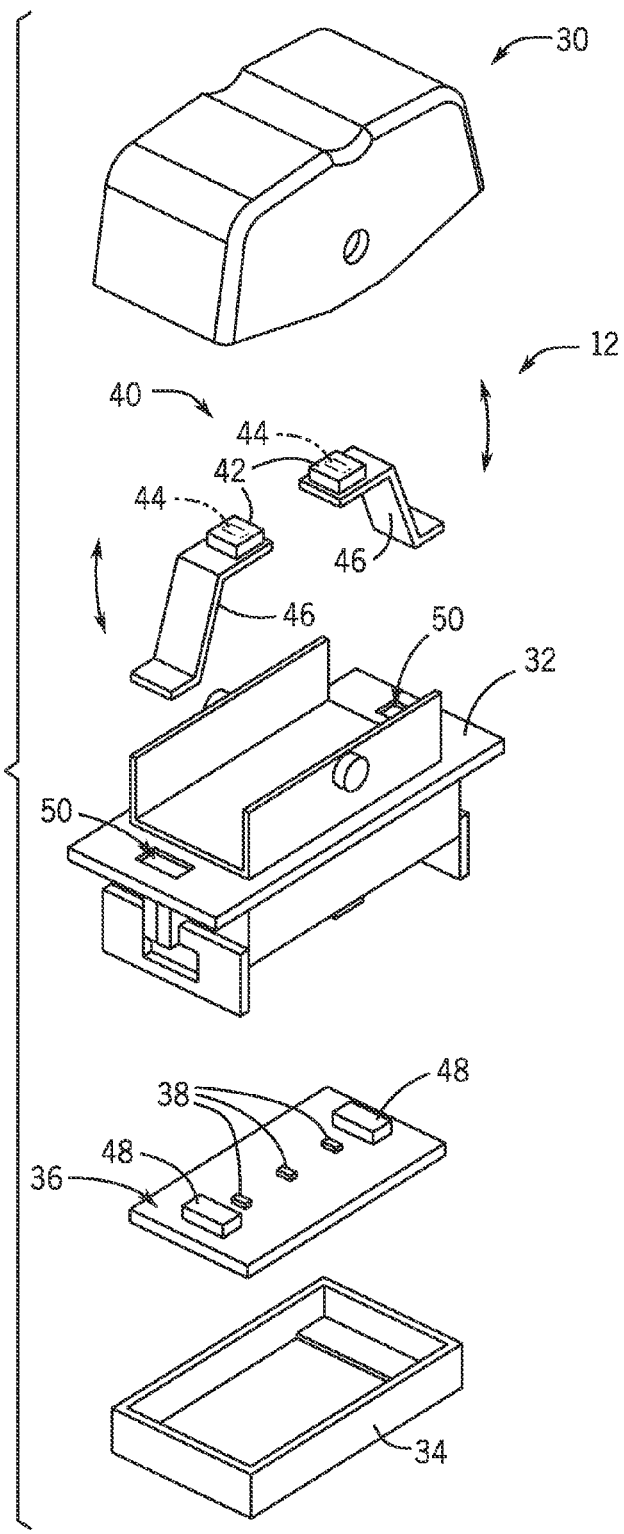
FIG. 2 is an exploded view of a switch included in the switch module of FIG. 1, according to an embodiment of the invention.

Referring now to FIG. 2, an exploded view of an individual switch 12 is shown in more detail. The switch 12 generally includes an operating member 30, a switch frame 32 on which the operating member is mounted, a rear plate 34, and a printed circuit board (PCB) 36 positioned between the switch frame 32 and the rear plate 34. According to an exemplary embodiment, the operating member 30 is in the form of a rocker button that is movable by an operator between an off/neutral position and one or more activated positions, with the rocker button 30 rotating relative to the switch frame 32 responsive to actuation of the button by the operator. In the embodiment of FIG. 2, the switch 12 is constructed as a rocker switch having a neutral position and two activated positions—a first activated position and a second activated position. If the user pushes one side of the rocker button 30, the rocker button 30 is moved to the first activated position and, if the user pushes the other side of the rocker button 30, the rocker button 30 is moved to the second activated position. In one embodiment, light emitting diodes (LEDs) 38 located on the PCB 36 provide illumination of graphic icons on the rockers 30 to provide a visual indication to the user of whether the rocker button 30 is in the neutral position, the first activated position or the second activated position.

Also included in the switch 12 is a radio-frequency identification (RFID) system 40 that includes at least one RFID tag 42, with each RFID tag 42 having data stored thereon regarding a unique identifier or address tying to the icon/function of the respective position of switch 12—such that the switch 12 may function as a self-identifying switch. For example, the identifying data stored on the RFID tags 42 may tie/identify the switch position as functioning to control headlights, hazard lights, windshield wipers, rear windshield heating, cruise control functions, or internal central locking, for example. According to the embodiment of the switch 12 provided in FIG. 2, the RFID system 40 is shown as including two RFID tags 42 therein—one RFID tag for each activated switch position—although it is recognized that only a single RFID tag 42 could be included in the switch 12. In one embodiment, the RFID tags 42 may be affixed to the rocker button 30 on an underside thereof, such as via an adhesive, snap fit engagement, or other suitable means.

Each of the RFID tags 42 contains an integrated circuit (IC) 44 for storing and processing information, modulating and demodulating an RF signal, and other specialized functions, as well as a non-volatile memory (not shown) for storing the tag information, and either fixed or programmable logic for processing the transmission and sensor data, respectively. In an embodiment where the RFID tags 42 are passive tags, i.e., the tags have no battery, the integrated circuit 44 also functions to collect DC power from radio energy transmitted by an RFID reader 56, although it is recognized that the RFID tags may instead be active tags or battery-assisted passive (BAP) tags, as will be explained in greater detail below.

For each RFID tag 42 in switch 12, a switch contact 46 (i.e., contact terminal) is provided that allows for the RFID tag 42 to selectively communicate with a corresponding antenna 48 that, according to one embodiment, is affixed to the PCB 36. That is, a switch contact 46 is electrically coupled to each RFID tag 42 and is movable between "opened" and "closed" positions responsive to actuation of the rocker button 30, such that the contact 46 will selectively provide for a communication path between the RFID tag 42 and its respective antenna 48 when moved to the closed position—with openings 50 being formed in frame 32 to provide for connection of the switch contacts 46 and the antennas 48. When a switch contact 46 is closed, its respective RFID tag 42 will transmit the data stored thereon—i.e., a unique address tying to the icon/function of the switch—to the antenna 48, with the antenna 48 then functioning to send out a wireless signal that includes this data—referred to hereafter as a "switch message." According to one embodiment of the invention, an antenna 48 is provided for each of the RFID tags 42, with each antenna 48 being in selective communication with its respective RFID tag 42; however, it is recognized that an alternative embodiment of the switch 12 could include only a single antenna 48 that would be utilized to broadcast signals for both of the RFID tags 42, with it being understood that no more than one of the RFID tags 42 would ever be in communication with the antenna 48 at any given time.

Figure 3:
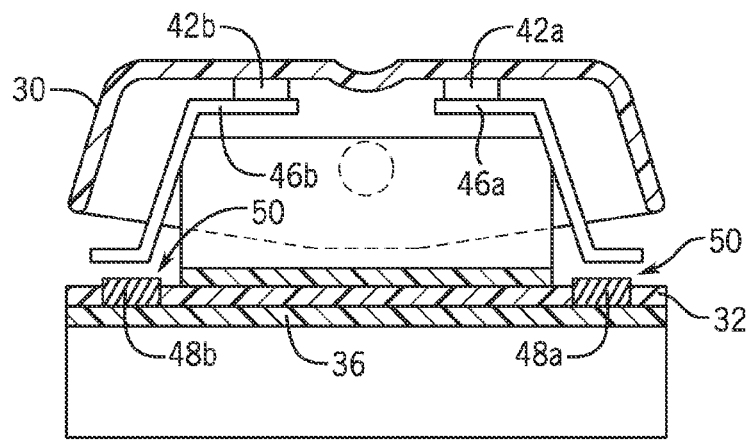
FIGS. 3-5 illustrate a cross-sectional view of the switch of FIG. 2, with the switch in a neutral position, first activated position, and second activated position, respectively.
Figure 4:
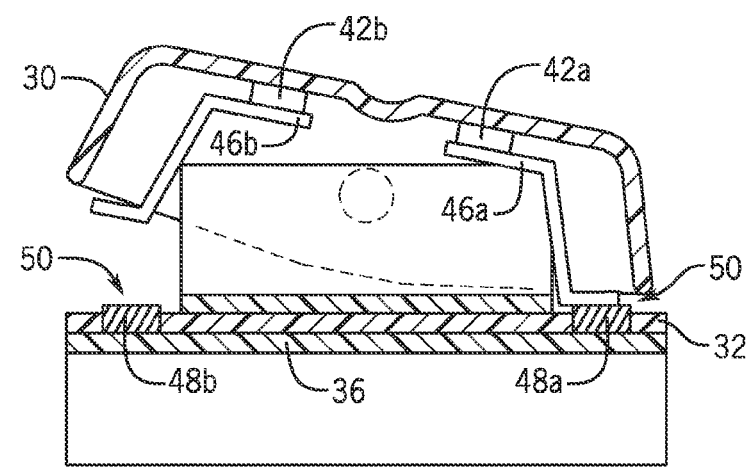
Figure 5:
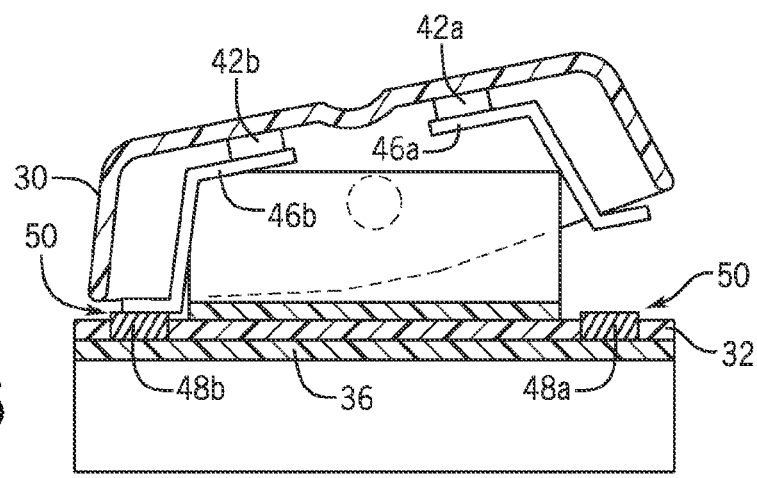

In operation of switch 12, the rocker button 30 is used in order to provide manual switching for the switch contacts 46. Referring to FIGS. 3-5, the switch is shown in each of the neutral position, first activated position and second activated position, with the positioning of the switch contacts 46 relative to antennas 48 being illustrated therein. As shown in FIG. 3, when the rocker button 30 is in the neutral position, then the two switch contacts 46a, 46b are in the switched-off state—separated from antennas 48a, 48b—such that no communication path is provided from the RFID tags 42a, 42b to their respective antennas 48a, 48b. As shown in FIG. 4, if the user pushes one side of the rocker button 30, the rocker button 30 is moved to a first activated position and, in consequence, a first RFID tag 42a and first switch contact 46a on the rocker button 30 are caused to translate downward such that the first switch contact 46a is electrically coupled to the first antenna 48a, such that the data stored on the RFID tag is provided to the antenna 48a and the antenna 48a transmits a wireless switch message that includes the data from the first RFID tag 42a. As shown in FIG. 5, in a second activated position of the rocker button 30, which is reached by pushing the other side of the rocker button 30, the second RFID tag 42b and second switch contact 46b are caused to translate downward such that the second switch contact 46b is electrically coupled to the second antenna 48b, such that the data stored on the RFID tag 42b is provided to the antenna 48b and the antenna 48b transmits a wireless switch message that includes the data from the second RFID tag 42b.

While the switches 12 in switch module 10 are shown and described in FIGS. 2-5 as being rocker switches having a neutral position and two activated positions, it is recognized that the switches 12 could also be constructed as rocker switches having only a neutral/off position and one activated/on position. In such an embodiment, only a single RFID tag 42 and switch contact 46 would be employed—with the switch contact 46 selectively connecting with an antenna 48 to provide a communication path between the RFID tag 42 and the antenna 48. Construction of a switch 12 as a pushbutton switch or toggle switch would similarly operate with there being only a single RFID tag 42 and switch contact 46, and a single respective antenna 48.

Figure 6:
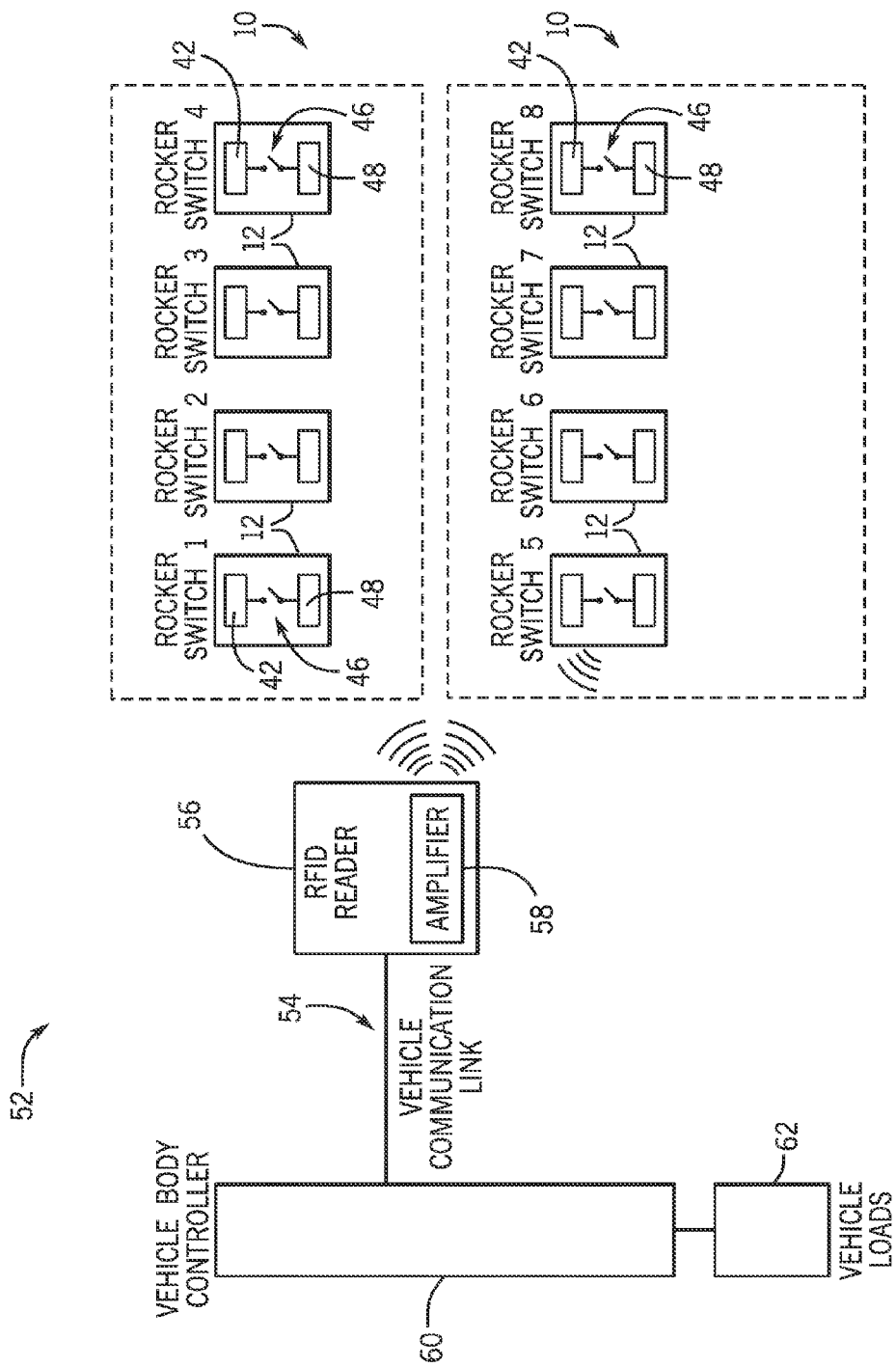
FIG. 6 is a schematic block diagram of a vehicle communication system that includes a plurality of self-identifying vehicle switches, according to an embodiment of the invention.

Referring now to FIG. 6, and with continued reference to FIGS. 1 and 2, a schematic diagram of a vehicle communication system 52 is shown according to an embodiment of the invention. The vehicle communication system 52 includes one or more switch modules 10 each having a plurality of switches 12 therein—such as shown and described in FIGS. 1 and 2—operatively connected to and in communication with a vehicle communication network or link 54, such as a CAN bus or LIN bus for example. That is, the switch modules 10 and switches 12 therein are multiplexed with the vehicle communication network or link 54 communication device (using a CAN or LIN protocol, for example) to interface with other devices on the vehicle.

To provide for communication between the switches 12 and the communication link 54, an RFID reader 56 is operably coupled to the communication link 54 that interacts with the switches 12 to receive information therefrom, with the RFID reader 56 being mountable on the vehicle chassis. In an exemplary embodiment, the RFID reader 56 and RFID tags 42 in switches 12 are provided as an Active Reader Passive Tag (ARPT) system—in which the RFID reader 56 transmits interrogator signals and receives authentication replies (in the form of switch messages) from passive RFID tags 42. In addition to interrogating the RFID tags 42 in order to receive authentication replies therefrom, the RFID reader 56 also functions to power/charge the RFID tags 42. For performing such a charging operation, the RFID reader 56 includes an antenna amplifier 58 that functions to selectively boost the strength of signals transmitted therefrom to the RFID tags 42, with a boosted "charging signal" being, for example, up to roughly a thousand times stronger than the interrogation signals transmitted by the RFID reader 56. The RFID tags 42 use the radio energy in the charging signals to charge components therein, such as the integrated circuit 44 of the RFID tag 42.

While the RFID tags 42 and RFID reader 56 are described above as an ARPT system in which the RFID reader 56 transmits interrogator signals and receives authentication replies from passive RFID tags 42, it is recognized that alternative embodiments could instead provide the RFID tags as active tags or battery-assisted passive (BAP) tags. When provided as active tags having an on-board battery, the RFID tags 42 periodically transmit switch messages out therefrom—i.e., transmit switch messages when their respective switch 12 is in an activated position and the RFID tag 42 is in communication with its antenna 48. When provided as BAP tags, the RFID tags 42 have a small battery on-board and are activated only when interrogated by the RFID reader 56.

In operation, the RFID reader 56 periodically scans the system 52 checking for the presence of RFID tags, with the RFID reader 56 transmitting an encoded radio signal to interrogate RFID tags 42 in the switches 12 of switch modules 10. The RFID reader 56 then detects a switch closure (i.e., a switch in an activated position) by detecting the presence of the RFID tags 42 responsive to the interrogation signal. A switch closure is only detected when the switch contact 46 is in a closed position that connects an antenna 48 to its respective RFID tag 42, with the closure of the switch contact 46 being based on the position of the rocker button 30 of the switch 12. Accordingly, the system logic used by the RFID reader 56 in interrogating the RFID tags 42 would be set forth simply as:

Switch contact closure is TRUE when the RFID reader reports the presence of the RFID tag.
Switch contact closure is FALSE when the RFID reader does not report the presence of the RFID tag.

Those RFID tags 42 that are connected to an antenna 48 by its respective switch contact 46 respond to the RFID reader 56 with a switch message that includes their identification and switch state information, with the RFID reader 56 receiving a switch message from each RFID tag 42 whose switch 12 is in an activated position. As each of the RFID tags 42 has an individual identification or serial number, the RFID reader 56 can discriminate among several RFID tags 42 that might be within the range of the RFID reader 56 and read them simultaneously.

After running the RFID scan, the switch messages received by the RFID reader 56 are provided to the vehicle communication link 54 and a serial message is sent on the communication link. The serial message contains the switch identifier and the switch state for each switch message received from the RFID tags 42. As shown in FIG. 3, the vehicle communication link 54 provides the serial message to a vehicle body controller 60 (i.e., CAN/LIN master controller), with the vehicle body controller 60 interpreting switch messages received from the switches 12—via RFID reader 56—and transmitting a command to the vehicle function/load 62, so as to cause the vehicle function/load to operate in a desired manner—such as sending a command to cause windshield wipers to turn-on.

According to embodiments of the invention, the switch modules 10 can operate within vehicle communication system 52 to identify the presence of a particular switch 12 and the switch's state. Thus, as indicated in FIG. 6 for example, any of "Rocker Switch 1" thru "Rocker Switch 8" could be individually identified to associate an individual identification to each switch 12 and a state of each switch 12. As indicated previously, each switch 12 contains a unique address/identifier associated with the switch function, with such address information being stored on the RFID tag(s) 42 included in the switch 12. The RFID reader 56 receives switch messages from the RFID tags 42 that contains the switch's address/identifier as well as the switch's logic state, and provides these messages in serial to the vehicle body controller 60, such that the vehicle body controller 60 interprets the switch messages for controlling/turning on an associated load/output 62.

Because each RFID tag 42 on a switch 12 contains a unique identifier and the RFID reader 56 receives signals from the RFID tags 42 that include these identifiers, an OEM can place a switch 12 in any position on a vehicle dashboard 14 without changing the switch's functionality. For example, swapping the positions of "Rocker Switch 2" with "Rocker Switch 7" would have no effect on the switches' functionality or the associated system/module wiring. Regardless of the location of Rocker Switch 2, for example, the RFID reader 56 would recognize that it is receiving a switch message from Rocker Switch 2 and that the switch is in either the first activated position or the second activated position, and would relay that information to the vehicle communication link 54 and turn on the appropriate load/output device 62 by way of the vehicle's body controller 60.

While embodiments described above make use of the RFID tag to provide a self-identifying vehicle control switch (provided on a vehicle dashboard) whose function and operational state is identifiable, it is recognized that additional embodiments of the invention may encompass other types of control systems and circuits that make use of RFID tags to provide for identification of an operational state of a switch. For example, an RFID tag may be incorporated into a motor starter or motor contactor that includes a number of contacts in order to beneficially enable identification of an operational state of the motor starter/contactor (i.e., a state or position of the contacts).

Figure 7:
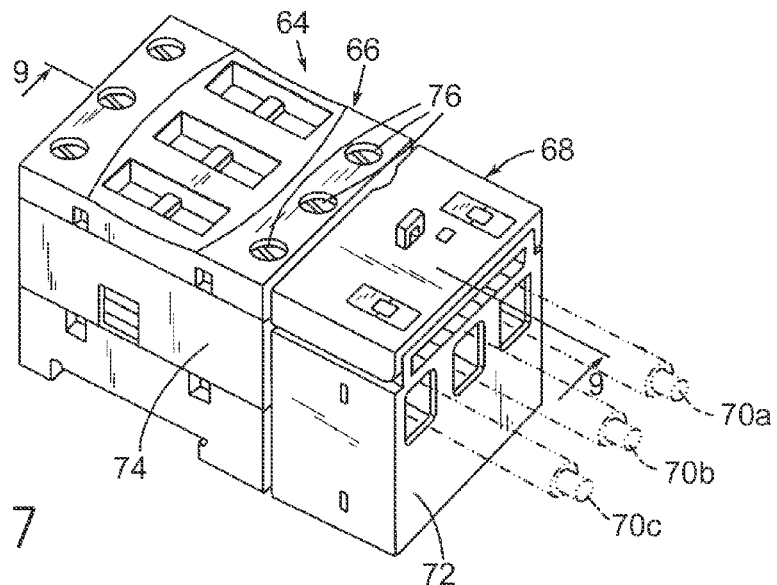
FIG. 7 is a perspective view of a contactor/motor starter, according to an embodiment of the invention.

Referring to FIG. 7, an exemplary a motor starter 64 is shown in which an RFID tag may be incorporated, according to an embodiment of the invention. However, the present invention can also be implemented into multiple types of starters, other preexisting motor starter units, electronic overload relay units, or contactors, and it is appreciated that embodiments of the present invention are not limited to the particular type of motor starter 64 shown in the figures.

In the embodiment depicted, motor starter 64 is a multi-phase motor starter as commonly used in industrial control applications, such as motor control. Motor starter 64 includes a contactor 66 and an overload relay 68. Contactor 66 is an electromagnetic contactor for switching supply current to a load (not shown). Overload relay 68 senses and measures the current to the load, and shuts off or de-energizes contactor 66 if too much current (overload) is flowing to the load, thus protecting the load. Overload relay 68 is shown connected with the contactor 66 at one end and accepts a series of conductors 70a, 70b, and 70c (shown in phantom) at another end through overload relay housing 72. Conductors 70a, 70b, and 70c extend through overload relay 68 and into contactor housing 74 and are secured by lugs 76. It is appreciated, however, that other embodiments of motor starter 64, contactor 66, and/or relay 68 may switch more or fewer lines, and thus may accept more or fewer conductors 70.

Figure 8:
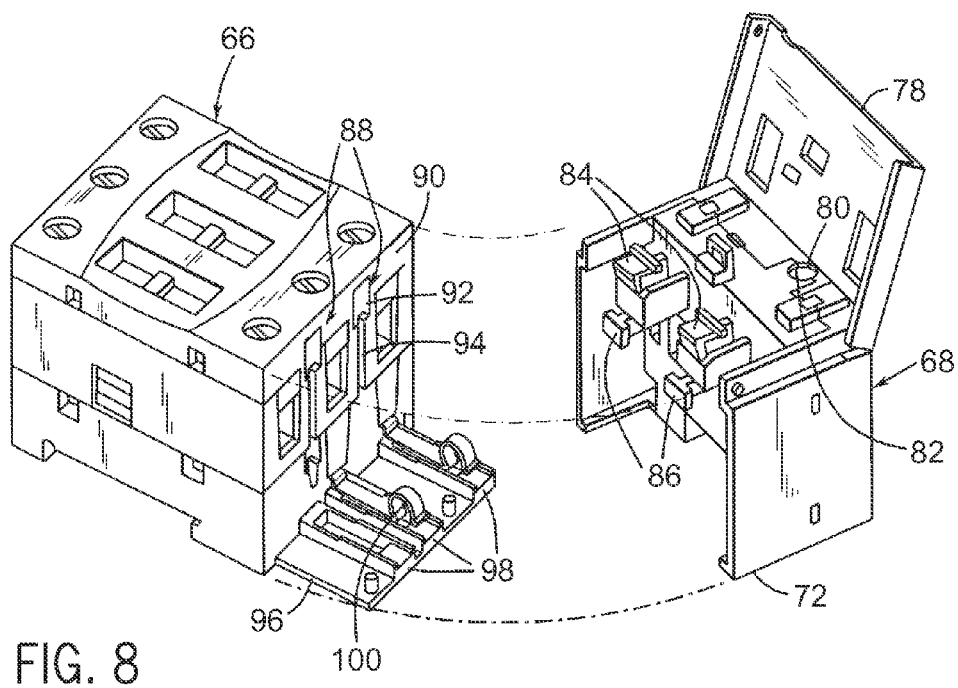
FIG. 8 is a perspective view of the contactor/motor starter of FIG. 7 with the contactor and overload relay separated.

Referring to FIG. 8, overload relay 68 and contactor 66 are shown in separation, and cover 78 of overload relay 68 is shown in a cover open position. Overload relay housing 72 includes a circular opening 80 through which the rotary knob of a potentiometer 82 connected to a printed circuit board (not shown) is disposed. Potentiometer 82 includes a screwdriver type slot for adjustment of the full load amperage of the particular motor with which the motor starter 64 is to be used.

In a preferred embodiment, the physical connection between overload relay 68 and contactor 66 is made with flexing lock tabs 84, which are each connected to a T-shaped retaining projection 86. Retainer projections 86 are insertable into connecting slots 88 within housing wall 90 of contactor 66. Receiving channels 92 of connecting slots 88 terminate in a retaining channel 94 which is narrower than the receiving channel 92 so as to prevent removal of a retaining projection 86 inserted into receiving channel 92 and slid downwardly into retaining channel 94. When a retainer projection 86 has been slid down into retaining channel 94, flexing lock tabs 84 will snap into connecting slots 88 of housing wall 90.

Contactor 66 includes a platform 96 which is integral with and extends substantially transversely to the plane of contactor wall 90. Platform 96 includes supports 98 for supporting flexible coil terminals 100 which extend outwardly from within the contactor 66. When coupled with contactor 66, the overload relay 68 is placed over the platform 96 to make an electrical connection with flexible coil terminals 100. In the embodiment shown, each coil terminal 100 is comprised of three separate conductive leads, while other similar embodiments utilize a number of separate coil terminals per phase connection. In an alternative implementation, each phase connection may have one coil terminal 100 with one conductive lead. Electrical connections may also be integrated with lock tabs 84 or retaining projection 86. In addition, while only two terminals 100 are shown, it is contemplated that other numbers and arrangements of terminals may be utilized. Contactor 66 may include a terminal 100 corresponding to each switched line or may include a number of terminals 100 for monitoring and controlling fewer than all switched lines of the contactor 66. Thus, a variety of electrical connections between contactor 66 and overload relay 68 can be achieved are known.

Figure 9:
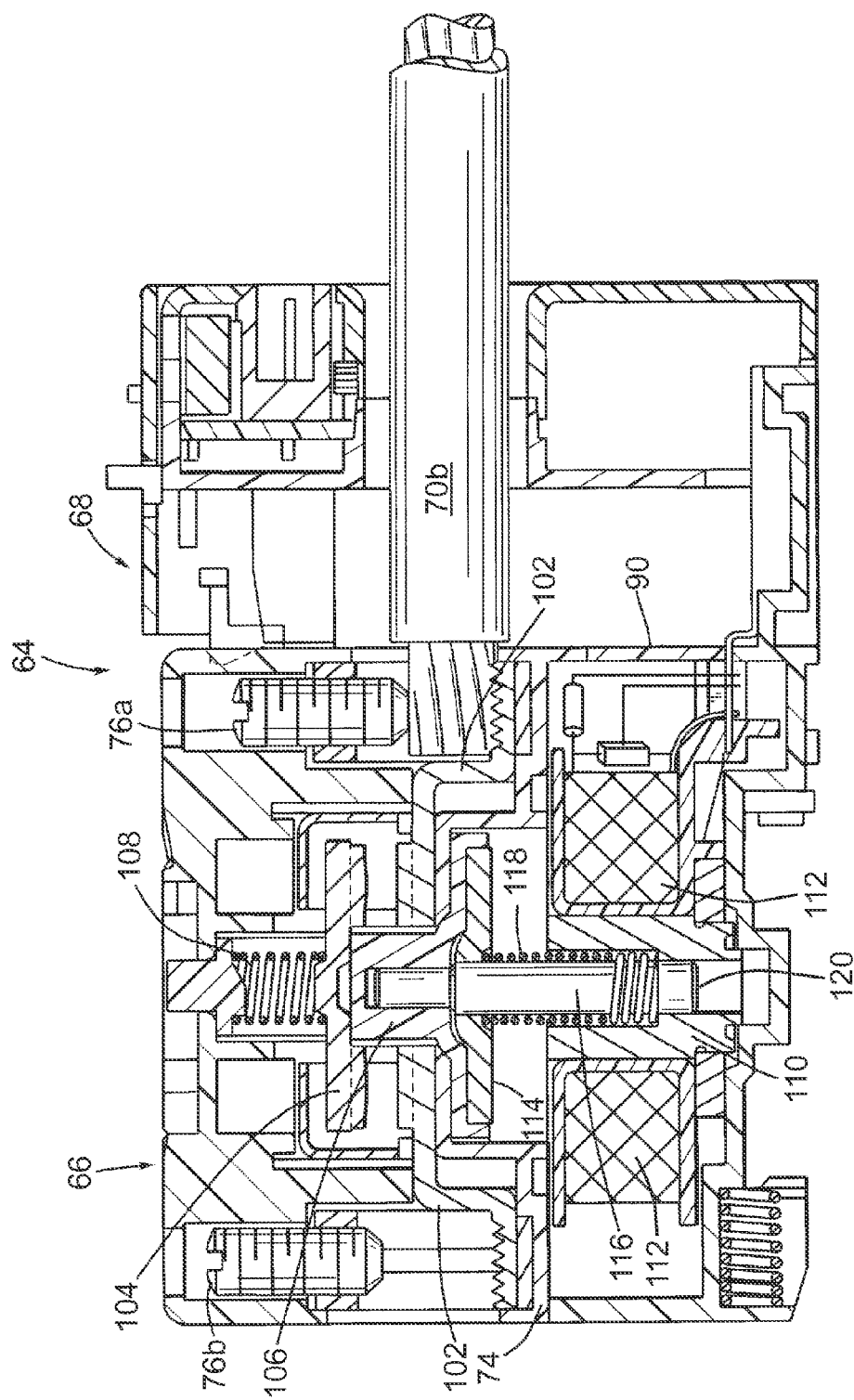
FIG. 9 is a cross-sectional view of the contactor/motor starter of FIG. 1 taken along line 9-9 of FIG. 7.

Referring to FIG. 9, a cross sectional view of motor starter 64 taken along line 9-9 of FIG. 7 is shown. Motor starter 64 is depicted in its coupled position wherein contactor 66 and overload relay unit 68 are physically and electrically engaged. One lug 76a of contactor 66 is shown securing conductor 70b to a stationary contact 102 on the load side of contactor 66. The other lug 76b is shown in an unfastened position on the line side of contactor 66. In the embodiment shown, one of the contact assemblies of contactor 66 includes a pair of stationary contacts 102 mounted to the contactor housing 74. A pair of moveable contacts 104 is mounted to a moveable contact carrier 106. The moveable contacts 104 are biased toward the stationary contacts 102 by a moveable contact biasing mechanism 108.

A magnetic core 110 surrounded by an electromagnetic coil 112 in a conventional manner is located on a base portion of contactor housing 74. In other embodiments, core 110 and coil 112 may be positioned above contacts 102, 104. Magnetic core 110 is preferably a solid iron member and electromagnetic coil 112 is preferably configured to operate on direct current (DC). It is appreciated, however, that the wellness monitoring aspects of the present invention are also applicable to AC actuating coils, albeit via modified calculations. When energized, magnetic core 110 attracts a magnetic portion or armature 114 of moveable contact carrier 106. Moveable contact carrier 106, along with magnetic armature 114, is guided towards the magnetic core 110 along guide pin 116.

Guide pin 116 is press-fit or molded securely into moveable contact carrier 106 at one end and is slidable along an inner surface of magnetic core 110. The single guide pin 116 is centrally disposed and is utilized in providing a smooth and even path for the armature 114 and moveable contact carrier 106 as they travel to and from the magnetic core 110. Preferably, guide pin 116 and inner surface of magnetic core 110 are manufactured so as to limit friction therebetween. Friction during movement of guide pin 116 and carrier 106 can be a major limiting factor on the useable life of a contactor. Guide pin 116 is partially enclosed by a resilient armature return spring 118, which is compressed as the moveable contact carrier 106 moves toward the magnetic core 110. Armature return spring 118 biases the moveable contact carrier 106 and the armature 114 away from magnetic core 110. Additionally, a bottom portion 120 of the of guide pin 116 may be used to dampen the end of its downward movement to help reduce bounce and cushion the closure of the armature 114 with magnetic core 110.

An operation cycle of contactor 66 begins at a contact open position in which moveable contacts 104 are not in engagement with stationary contacts 102 and no line or phase current is flowing therethrough. A closing operation commences when coil 112 is energized by a DC control voltage causing magnetic core 110 to attract magnetic armature 114 of contact carrier 106. The downward attraction of armature 114 causes carrier 106 and pin 116 to overcome the bias of armature return spring 118. One of the phases of a three phase line current will begin to flow through conductor 70b when moveable contacts 104 first touch stationary contacts 102. Preferably, contact carrier 106, armature 114, and guide pin 116 will continue to move downward after contacts 102 and 104 have fully engaged until the armature 114 seals against the upper surface of core 110, stopping movement. This over-travel of carrier 106 increases contact engagement pressure to better hold moveable contacts 104 and stationary contacts 102 together.

An opening operation commences when the DC control voltage applied to coil 112 is turned off. Current through coil 112 dissipates, and magnetic core 114 ceases to attract armature 114 strongly enough to overcome the bias of armature return spring 118 as well as the contact force springs 108. Thus, carrier 106, armature 114, and guide pin 116 begin upward movement, and are joined by moveable contacts 104 after the over-travel distance. After moveable contacts 104 and stationary contacts 102 are no longer engaged, line current through conductor 70b will be interrupted. That is, current will flow between moveable contacts 104 and stationary contacts 102 for a very brief time after disengagement due to arcing, but will cease once the arc extinguishes. The bias of spring 118 causes contactor 66 to return to the contact open position.

Figure 10:
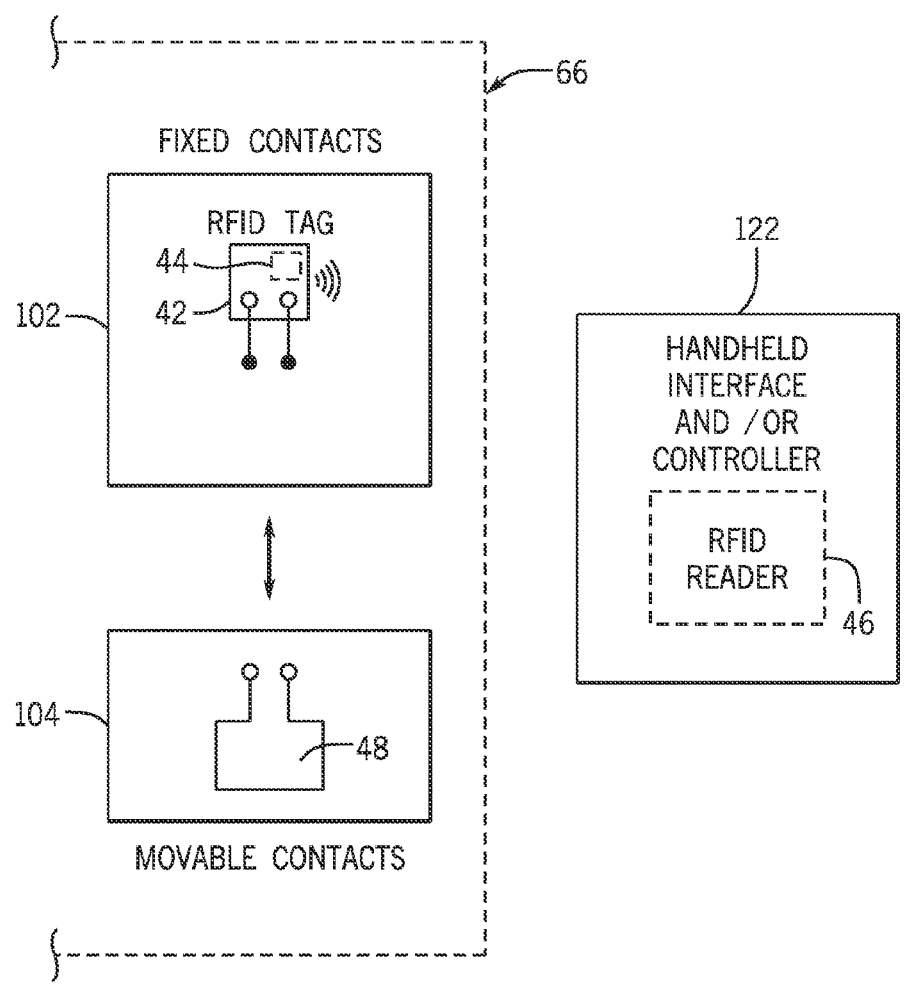
FIG. 10 is a schematic illustration of an RFID tag incorporated into a contact of the contactor/motor starter of FIG. 7, according to an embodiment of the invention.

According to an exemplary embodiment, in order to provide for a determination of the contact position of the movable contacts 104, contactor 66 incorporates an RFID tag and associated antenna therein that function to provide for remote determination of the contact position (and thus the state/condition of the contactor). Referring now to FIG. 10, a schematic diagram of a portion of the contactor 66 is provided that illustrates inclusion of an RFID tag 42 and antenna 48 therein relative to the stationary and moveable contacts 102, 104 of the contactor 66. As can be seen in FIG. 10, the RFID tag 42 is located on the stationary contact 102 of the contactor, while the antenna 48 is located on the movable contact 104 (i.e., on the moveable contacts 104 or on the moveable contact carrier 106). As the RFID tag 42 is located in the stationary contact 102 of the contactor 66 and the antenna 48 is located on the movable contact 104, the RFID tag 42 selectively communicates with the antenna 48 based on the positioning of the movable contact 104. That is, the movable contact 104 is movable between "contacts opened" and "contacts closed" positions relative to the stationary contact 102 in order to selectively provide for a communication path between the RFID tag 42 and its respective antenna 48 when moved to the closed position. When the movable contact 104 is closed, the RFID tag 42 will transmit to the antenna 48, with the antenna 48 then functioning to send out a wireless signal that includes the state or position of the movable contact 104—and thus consequently the state of the contactor 66.

When the movable contact 104 is closed, the RFID tag 42 will transmit to the antenna 48 so as to cause a wireless signal to be transmitted therefrom that is received by an RFID reader 56 that is in operable communication with the antenna 48 and located remotely therefrom. In one embodiment, the RFID reader 56 may be incorporated as part of a handheld interface or controller 122 to provide information thereto regarding the operational state of the contactor 66. Incorporation of the RFID tag 42 and antenna 48 in contactor 66 allows for a determination of the state of the motor starter 64 (and of the contactor 66) at a safe distance—such as from outside an arc flash boundary—even when potentially energized.

In an exemplary embodiment, the RFID reader 56 and RFID tag 42 in/for contactor 66 are provided as an Active Reader Passive Tag (ARPT) system—in which the RFID reader 56 transmits interrogator signals and receives authentication replies (in the form of switch messages) from passive RFID tag 42. In addition to interrogating the RFID tag 42 in order to receive authentication replies therefrom, the RFID reader 56 also functions to power/charge the RFID tag 42. For performing such a charging operation, the RFID reader 56 includes an antenna amplifier 58 that functions to selectively boost the strength of signals transmitted therefrom to the RFID tag 42, with a boosted "charging signal" being, for example, up to roughly a thousand times stronger than the interrogation signals transmitted by the RFID reader 56. The RFID tag 42 uses the radio energy in the charging signals to charge components therein, such as an integrated circuit 44 of the RFID tag 42 that functions to store and process information, modulate and demodulate an RF signal, and perform other specialized functions.

While the RFID tag 42 and RFID reader 56 are described above as an ARPT system in which the RFID reader 56 transmits interrogator signals and receives authentication replies from a passive RFID tag 42, it is recognized that alternative embodiments could instead provide the RFID tag as an active tag or battery-assisted passive (BAP) tag. When provided as active tags having an on-board battery, the RFID tag 42 periodically transmits messages out therefrom—i.e., transmit messages when the movable contact is in the closed position and the RFID tag 42 is in communication with the antenna 48. When provided as a BAP tag, the RFID tag 42 has a small battery on-board and is activated only when interrogated by the RFID reader 56.

Beneficially, inclusion of the RFID tag 42 (and antenna 48) in the contactor 66 of motor starter 64 allows for an accurate determination of the state of the contactor 66 (opened or closed), with such determination of the state of the motor starter/contactor being made at a safe distance (outside an arc flash boundary) even when potentially energized. Such determination of the state of the contactor 66 can be performed despite failure of the actuating coil, contact welding of the contacts, or the movable contact assembly becoming jammed due to debris or other mechanical interference, and can be performed with all energy removed from the equipment (i.e. meters, sensors, or other equipment that would likely require power to monitor the state of an auxiliary contactor can be de-energized). The inclusion of the RFID tag 42 (and antenna 48) in the motor starter/contactor thus negates the need for any auxiliary contactor mechanically linked to the moving contactor assembly of the primary contactor and any associated wiring and equipment to determine the electrical state of the auxiliary contactor, therefore reducing the cost and complexity of the contactor. Of still further benefit, the RFID tag 42 can easily be included in all motor starter/contactors due to the low cost of the RFID tag and antenna and due to the RFID tag and antenna requiring less space that an auxiliary contactor (such that it could likely fit in the dimensional envelope of an existing motor starter/contactor).

Therefore, according to one embodiment of the present invention, a contactor includes separable contacts comprising a fixed contact structure and a movable contact structure having a closed position and an open position, an electromagnet arranged to translate the movable contact structure between the closed position and the open position, and an RFID tag positioned on or adjacent the separable contacts to indicate the position of the movable contact structure.

According to another embodiment of the present invention, a method of determining a state of a contactor that includes providing an RFID tag on a fixed contact structure of the contactor, providing an antenna on a movable contact structure of the contactor, and determining a position of the movable contact structure in one on a contacts open position and a contacts closed position, wherein determining the position of the movable contact structure further includes forming a communications path between the RFID tag and the antenna when the movable contact structure is in the contacts closed position and transmitting a switch signal from the antenna to an RFID reader remote from the contactor, the switch signal indicating that the movable contact structure is in the contacts closed position.

According to yet another embodiment of the present invention, a contactor includes at least one pair of moveable contacts, at least one pair of stationary contacts, an electromagnet arranged to cause the at least one pair of moveable contacts to travel to a contacts open position and a contacts closed position with respect to the at least one pair of stationary contacts, an RFID tag located on the at least one pair of stationary contacts, and an antenna located on the at least one pair of moveable contacts, wherein a communications path between the RFID tag and the antenna is formed by the at least one pair of moveable contacts when the at least one pair of moveable contacts is in the contacts closed position.

The present invention has been described in terms of the preferred embodiment, and it is recognized that equivalents, alternatives, and modifications, aside from those expressly stated, are possible and within the scope of the appending claims.

What is claimed is:

1. A contactor comprising:
   separable contacts comprising a fixed contact structure and a movable contact structure having a closed position and an open position;
   an electromagnet arranged to translate the movable contact structure between the closed position and the open position;
   a radio frequency identification (RFID) tag positioned on or adjacent the separable contacts to indicate the position of the movable contact structure; and
   an antenna selectively in operable communication with the RFID tag based on the position of the movable contact structure;
   wherein the movable contact structure forms a communications path between the RFID tag and the antenna when in the closed position, with the antenna transmitting a switch message when the communications path is formed between the RFID tag and the antenna.

2. The contactor of claim 1 wherein the RFID tag is located on the fixed contact structure and the antenna is located on the movable contact structure.

3. The contactor of claim further comprising an RFID reader configured to receive the switch messages from the RFID tag that indicate the position of the movable contact structure.

4. The contactor of claim 3 wherein the RFID reader is incorporated into a handheld interface device.

5. The contactor of claim 3 wherein the RFID reader transmits interrogator signals to the RFID tag, with the RFID tag generating the switch messages responsive to the interrogator signals.

6. The contactor of claim 1 wherein the contactor further comprises a contactor housing positioned about the separable contacts and the electromagnet, and wherein the RFID tag and the antenna are also positioned within the contactor housing.

7. The contactor of claim 1 wherein the RFID tag is configured to indicate the position of the movable contact structure with the contactor in a de-energized state.

8. The contactor of claim 1 wherein the RFID tag provides for an indication of the position of the movable contact structure without the use of any auxiliary contactors.

9. A method of determining a state of a contactor, the method comprising:
   providing a radio frequency identification (RFID) tag on a fixed contact structure of the contactor;
   providing an antenna on a movable contact structure of the contactor; and
   determining a position of the movable contact structure in one of a contacts open position and a contacts closed position;
   wherein determining the position of the movable contact structure comprises:
      forming a communications path between the RFID tag and the antenna when the movable contact structure is in the contacts closed position; and
      transmitting a switch signal from the antenna to an RFID reader remote from the contactor, the switch signal indicating that the movable contact structure is in the contacts closed position.

10. The method of claim 9 wherein the antenna moves with the movable contact structure, such that the communications path between the RFID tag and the antenna is formed when the movable contact structure is in the contacts closed position.

11. The method of claim 9 wherein determining the position of the movable contact structure comprises transmitting interrogator signals from the RFID reader to the RFID tag, with the RFID tag generating the switch signal responsive to the interrogator signals.

12. The method of claim 9 wherein the position of the movable contact structure is determined while the contactor is in a de-energized state.

13. The method of claim 9 wherein the position of the movable contact structure is determined without the use of any auxiliary contactors.

14. A contactor comprising:
   at least one pair of moveable contacts;
   at least one pair of stationary contacts;
   an electromagnet arranged to cause the at least one pair of moveable contacts to travel to a contacts open position and a contacts closed position with respect to the at least one pair of stationary contacts;
   an RFID tag located on the at least one pair of stationary contacts; and
   an antenna located on the at least one pair of moveable contacts;
   wherein a communications path between the RFID tag and the antenna is formed by the at least one pair of moveable contacts when the at least one pair of moveable contacts is in the contacts closed position.

15. The contactor of claim 14 wherein, when the at least one pair of moveable contacts is in the contacts closed position, the communications path between the RFID tag and the antenna provides for the antenna to transmit a switch signal to an RFID reader remote from the contactor.

16. The contactor of claim 15 wherein the RFID reader transmits interrogator signals to the RFID tag, with the RFID tag generating the switch signal responsive to the interrogator signals.

17. The contactor of claim 14 further comprising a contactor housing positioned about the at least one pair of moveable contacts, the at least one pair of stationary contacts and the electromagnet, wherein the RFID tag and the antenna are also positioned within the contactor housing.

18. The contactor of claim 14 wherein the RFID tag is configured to indicate the position of the at least one pair of moveable contacts with the contactor in a de-energized state.

* * * * *